United States Patent [19]
Hardey et al.

[11] Patent Number: 5,737,968
[45] Date of Patent: Apr. 14, 1998

[54] INTEGRATED GEAR MOTOR AND METHOD OF ASSEMBLY

[76] Inventors: Donald H. Hardey, 1103 Mary Ave., Dixon, Ill. 61021; William R. Gerhard, 637 N. Quail Dr., Lena, Ill. 61048

[21] Appl. No.: 646,507

[22] Filed: May 7, 1996

[51] Int. Cl.⁶ ............................................. F16H 1/20
[52] U.S. Cl. ............................................. 74/421 A
[58] Field of Search ........................ 74/421 A, 606 R

[56] References Cited

U.S. PATENT DOCUMENTS

| | | | |
|---|---|---|---|
| 3,801,876 | 4/1974 | Lotspeich | 74/40 |
| 4,092,575 | 5/1978 | Ogishi et al. | 318/282 |
| 4,754,362 | 6/1988 | Beller | 361/31 |
| 4,785,242 | 11/1988 | Vaidya et al. | 324/208 |
| 5,256,921 | 10/1993 | Pruis et al. | |
| 5,463,914 | 11/1995 | Tyan | 74/421 A X |
| 5,584,207 | 12/1996 | Paul | 74/421 A X |

*Primary Examiner*—Charles A. Marmor
*Assistant Examiner*—David M. Fenstermacher
*Attorney, Agent, or Firm*—McCaleb, Lucas & Brugman

[57] ABSTRACT

A gear motor assembly having a three-part molded housing consisting of a gear case having one open side for housing a reduction gear train, a rotatably driven output shaft and coaxial cam; a circuit board cover having one open side for housing a printed circuit board and motor control components including a cam operated switch for periodically deenergizing an electric DC motor also mounted on the circuit board, and a gear case cover interposed between the gear case and circuit board, which is welded to the gear case and circuit board cover to effect a sealed protective housing.

11 Claims, 4 Drawing Sheets

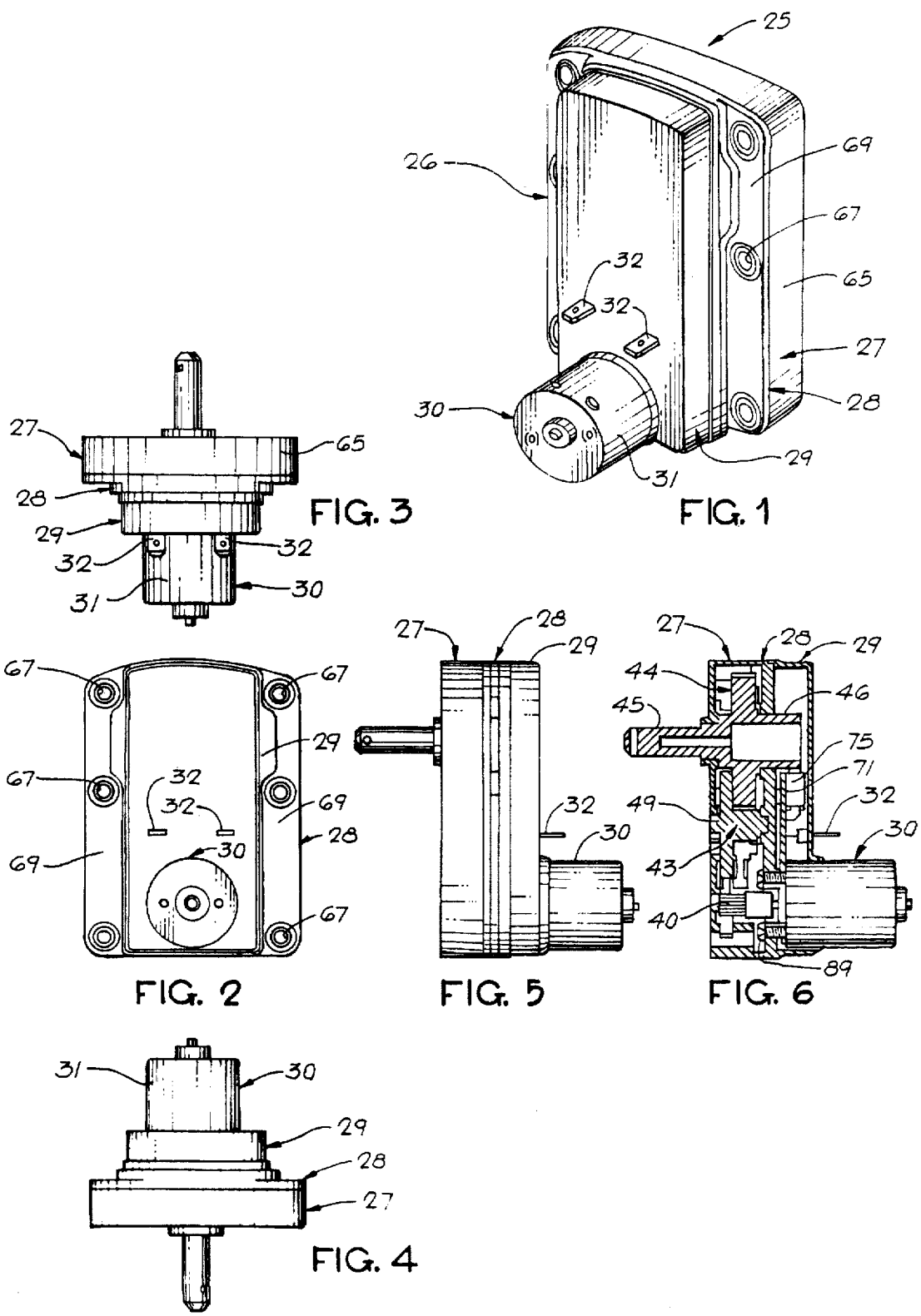

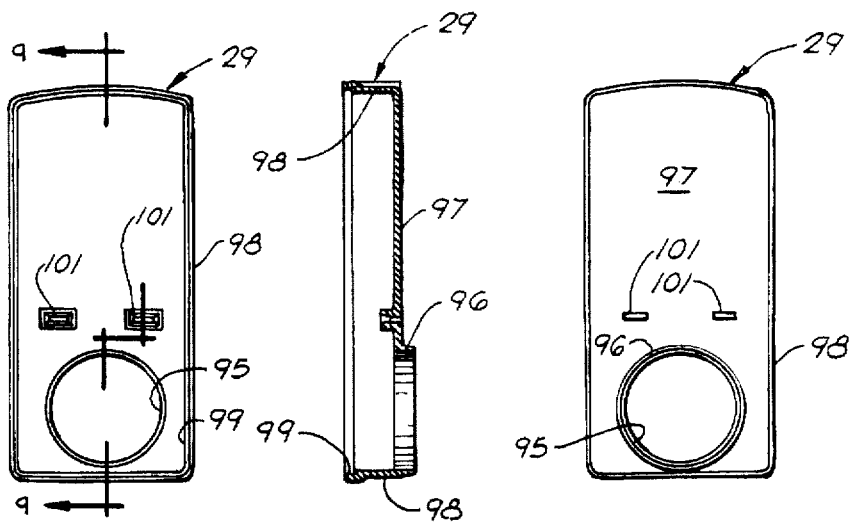
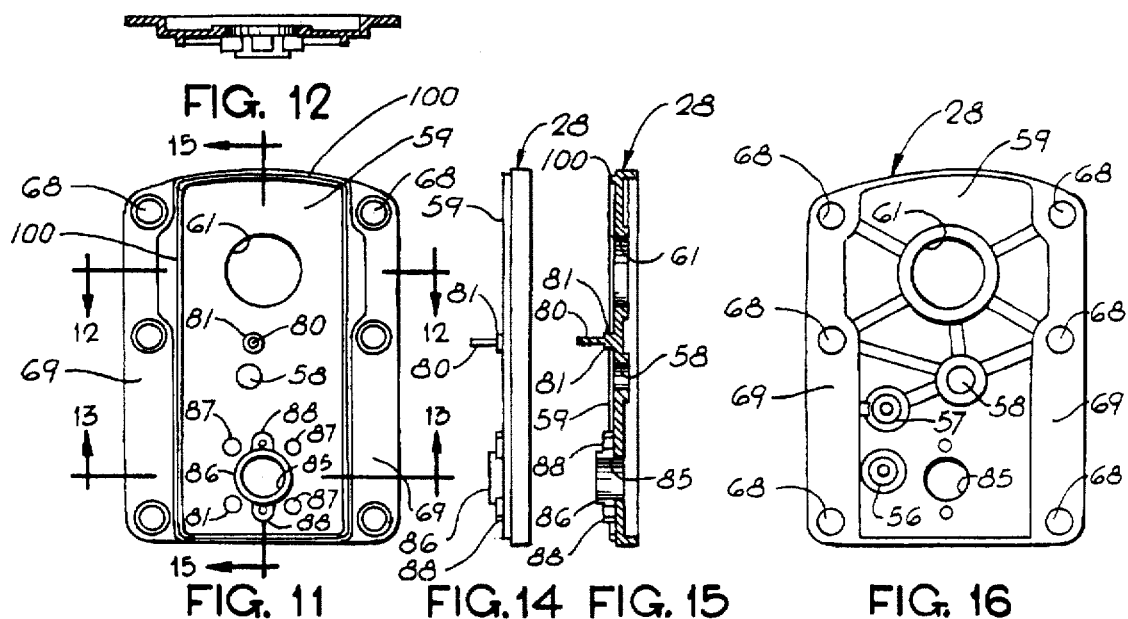
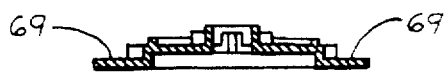

INTEGRATED GEAR MOTOR AND METHOD OF ASSEMBLY

This invention relates to gear motor assemblies and the operational controls therefor and more particularly is related to an improved method for assembling the housing, motor and control components of a gear motor into an integrated unit.

BACKGROUND OF THE INVENTION

In general coin controlled vending machines dedicated to vending individual articles, such as candy, fruit, sandwiches and other packaged food items, as well as sundry articles ranging from hair combs to lottery games scratch cards, generally employ coin controlled vending mechanisms for delivering selected items to a customer accessible vending stage.

According to popular practice such vending mechanisms frequently are driven by an electric gear motor energized via a control circuit which reacts to the deposit of preselected coin value and customer selection of desired products to be vended. Frequently, the control circuit may be regulated by computer or logic board and usually incorporates plural switches for time energization and deenergization of the motor so that only one article is delivered to the customer for each required coin deposit.

Inasmuch as vending machines are operated in all types of climates and atmospheres, it is essential to dependable, repair-free operation that the motor and its controls be adequately protected from oil, dust, moisture, and similar environmental hazards. Currently many gear motor assemblies have exposed or partly exposed control circuitry and components resulting in reduced operating life for the motor assembly. In those instances where more protective housings have been resorted to, attendant structural complexities and assembly problems have arisen.

SUMMARY OF THE INVENTION

In brief this invention is directed to an improved gear motor assembly wherein the motor, its gear train and related control components and circuitry are substantially encased within a sealed three-part protective housing.

The housing comprises a gear case, a gear case cover and a circuit board cover, all preferably molded of plastic to tightly interfit with one another for ultimate sealed integration. In assembly the gear case and circuit board cover are welded or otherwise permanently secured in sealed relation with the gear case cover to provide a sealed enclosure for the components of the gear motor assembly. In the particular preferred embodiment disclosed herein, the motor and its drive pinion are sub-assembled with the motor control circuit board and secured over a locator guide to one face of the gear case cover. The circuit board cover is then mounted over the assembled motor and circuit board and fitted over one side of the gear case cover to which it is welded to provide a sealed unitary assembly. The gear case in turn is sub-assembled with its reduction gear train and then sealed over by the aforenoted gear case cover carrying the motor and control circuit sub-assembly; the gear case being located on the opposite side of the gear case cover from the motor and control circuit board.

It is a principle object of this invention to provide an improved gear motor assembly which is protectively housed in a sealed, unitary enclosure.

Another important object of this invention is to provide a three-part housing for enclosing the components of a gear motor and its controls, which promotes simplified, efficient and economic method of component assembly.

Still another object of this invention is to provide an improved housing for a gear motor assembly which serves to protectively isolate the assembly from environmental contaminants.

Having thus described this invention, the above and further objects, features and advantages thereof will be recognized from the following description of a preferred embodiment thereof, illustrated in the accompanying drawings and representing the best mode presently contemplated for those skilled in the art to make and practice this invention.

IN THE DRAWINGS

FIG. 1 is an isometric view of a gear motor assembly embodying the present invention;

FIG. 2 is a front elevational view of the assembly shown in FIG. 1;

FIG. 3 is a top plan view thereof;

FIG. 4 is a bottom plan view thereof;

FIG. 5 is a left side elevational view thereof;

FIG. 6 is a full cross sectional view taken substantially along the longitudinal center line of the FIG. 1 assembly with the motor shown in full elevation therein;

FIG. 8 is a rear elevational view of the circuit board cover shown in FIG. 7;

FIG. 9 is a cross sectional view of the cover shown in FIG. 8, taken substantially along vantage line 9—9 of FIG. 8 and looking in the direction of the arrows thereon;

FIG. 10 is a front elevational view of the cover shown in FIG. 8;

FIG. 11 is a front elevational view of the gear case cover shown in FIG. 7;

FIG. 12 is a cross sectional view taken substantially along vantage line 12—12 of FIG. 11 and looking in the direction of the arrows thereon;

FIG. 13 is another cross sectional view taken substantially along vantage line 13—13 of FIG. 11 and looking in the direction of the arrows thereon;

FIG. 14 is side elevational view of the cover shown in FIG. 11 as viewed from the right hand side thereof;

FIG. 15 is a longitudinal cross sectional view of the cover shown in FIG. 11, taken substantially along vantage line 15—15 of FIG. 11 looking in the direction of the arrows thereon;

FIG. 16 is a rear elevational view of the cover shown in FIG. 11;

DESCRIPTION OF THE PREFERRED EMBODIMENT

Figures 7, 7A:
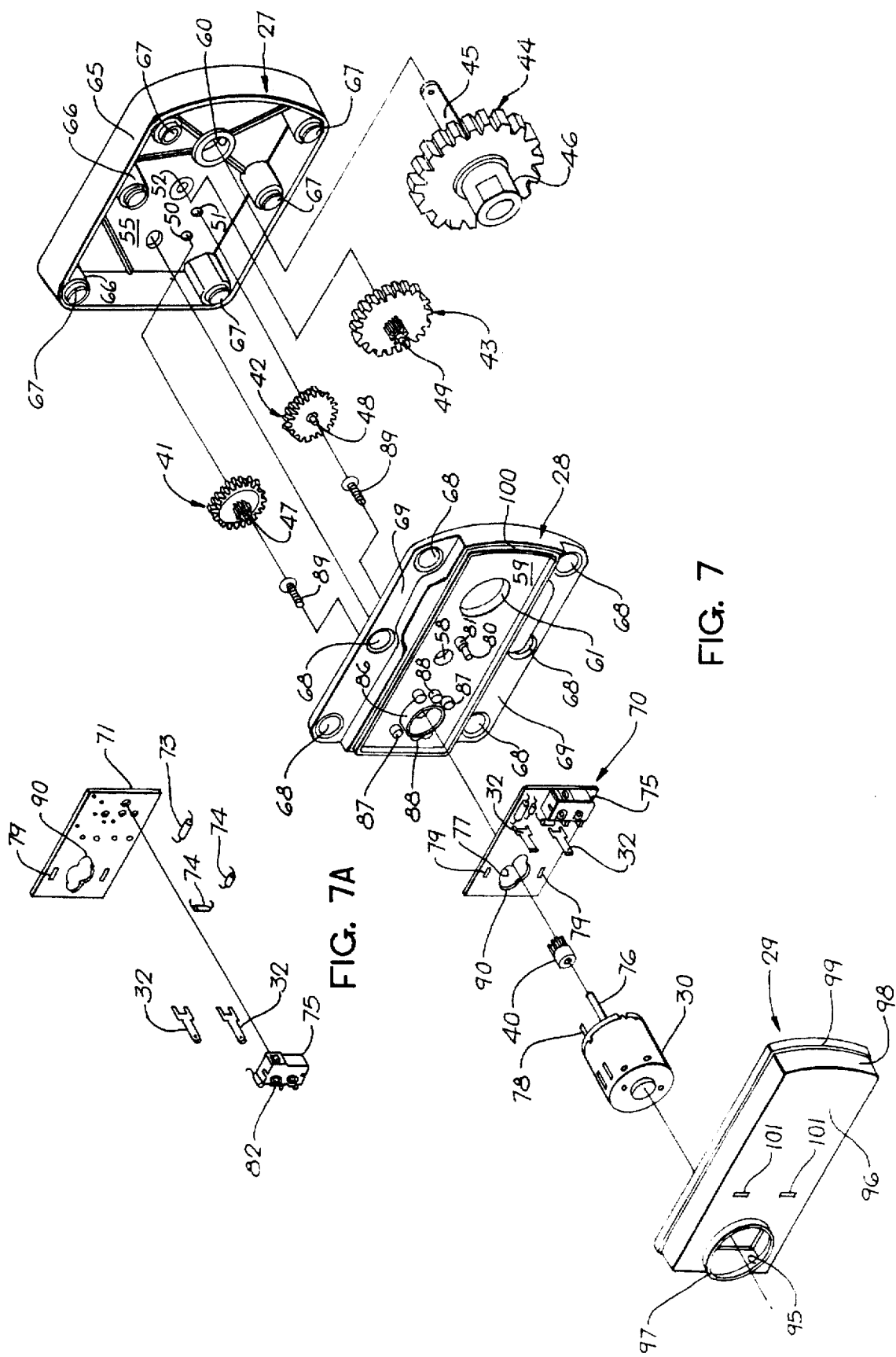
FIG. 7 is an exploded perspective view of the motor assembly and its components shown in FIG. 1.
FIG. 7A is an exploded perspective view of the circuit board assembly illustrated in FIG. 7.

With initial reference to FIGS. 1–6 of the drawings, a gear motor assembly according to this invention is indicated generally at 25. Assembly 25 comprises a three-part housing indicated generally at 26 formed by a gear case 27 molded of dialetric material, a gear case cover 28 and a molded circuit board cover 29. In assembly these three housing parts are unified as will appear in greater particular hereinafter. The housing assembly 26 encases and seals various working components of the gear motor assembly including electric motor 30, except for a portion of the motor casing 31 and outer end portions of two male power supply terminals 32, 32 for joining the motor and associated control circuit components to a suitable power supply, typically a 24 volt DC 150 miliamp, power supply.

As more clearly illustrated in FIGS. 7 and 7A, assembly 25 comprises the aforementioned housing parts 27–29 which serve to protect the internal working components of the motor assembly against moisture, dust and similar external contaminants. More specifically it will be recognized that gear case 27 houses a reduction gear train within its interior comprising in this particular illustrated case, a motor driven pinion 40, a first compound spur gear and pinion gear 41, a compound spur and idler gear 42 for driving a larger diameter second compound spur and pinion gear 43 engageable with the toothed periphery of a large power output spur gear 44. Gear 44 is characterized by coaxially aligned output shaft portion 45 and cam portion 46 extending from opposite end faces of the gear as will be described more fully hereinafter. The several spur gears 41, 42 and 43 have coaxially cylindrical trunnions 47, 47; 48, 48 and 49, 49, respectively, extending from their opposite axial ends whereby the gears are rotatably supported by and between the gear case 27 and the gear case cover 28.

With respect to the gear support by gear case 27 and cover 28, the axially extending trunnions 47, 48 and 49 at one end of the gears 41, 42 and 43, respectively, are inserted into cylindrical bearing centers 50, 51 and 52 formed integrally with rear wall 55 of the gear case as indicated in FIG. 7. When the gear case cover is assembled over the gear case the corresponding trunnions 47 and 48 on opposite ends of gears 41 and 42, respectively, enter cylindrical bearing bosses 56, 57 projecting rearwardly from a planar mounting platform wall 59 of the gear case cover 28 (see FIG. 16). The gear trunnion 49 extending from gear 43, as shown in FIG. 7, enters and is centered by bearing opening 58 in wall 59 of cover 28.

The large output gear 44 is rotatably supported in a similar fashion by and between the gear case and its cover with the driven or output shaft portion 45 thereof extending through a cylindrical opening 60 in the gear case wall 55. Similarly the cam portion 46 thereof extends through the cylindrical opening 61 in the gear case cover 28. It will be noted from FIG. 23 in particular that shaft portion 45 of gear 44 is formed integrally with a cylindrical bearing collar 62 and a larger diametered stop shoulder 63 immediately adjacent the body of gear 44. The bearing collar 62 rotatably engages the walls of the cylindrical opening 60 while the end face 64 of shoulder 63 abuttingly engages the inside face of the gear case wall 55 in assembly.

Importantly, when the several gears are mounted in the case 27, lubricant is applied to the gears, especially the bearing centers thereof prior to mounting cover 28 thereover and securing the same over the open side of the gear case. Regarding this latter aspect of assembly, it will be noted that the gear case is formed with a protective side wall 65 extending at right angles to the plane of its back wall 55 in bordering relation with the periphery of wall 55.

Internally of the gear case are six cylindrical connector bosses 66 at spaced locations adjacent the bordering side wall 65. Each boss 66 has a thinner walled cylindrical collar 67 extending axially outward from its outer end. Such collars are aligned to enter corresponding spaced openings 68 formed through co-planar platform portions 69, 69 extending along lateral sides of the central platform 59 of the gear case cover 28. In the final assembly of the gear case cover over the open side of the gear case 27 and its assembled gear train, the cylindrical collars 67 within the cover openings 68 are spun over and extended radially outwardly to interlock the gear case cover and gear case tightly together, thereby protectively encasing the gear train. Before such final assembly, however, the gear case cover is preassembled with the motor 30 and motor control assembly 70 as best shown in FIG. 7.

Figure 18:
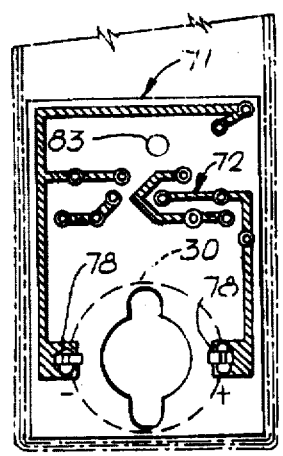
FIG. 18 is a rear elevational view of the circuit board illustrating its mounted position within the circuit board cover of FIGS. 8–10 indicated by phantom lines.
Figure 19:
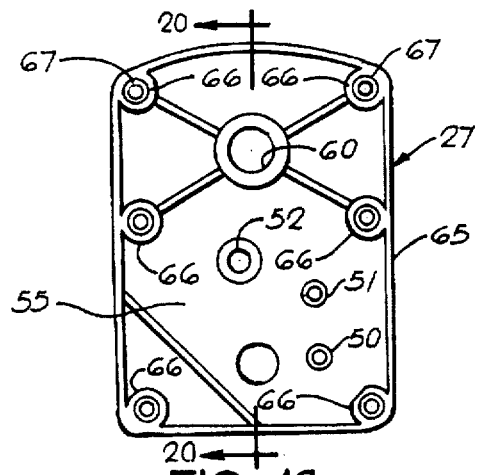
FIG. 19 is a rear elevational view showing the interior of the gear case shown in FIG. 7.
Figure 20:
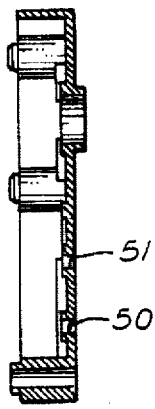
FIG. 20 is a longitudinal cross sectional view of the gear case, taken substantially along vantage line 20—20 of FIG. 19 and looking in the direction of the arrows thereon.
Figure 21:
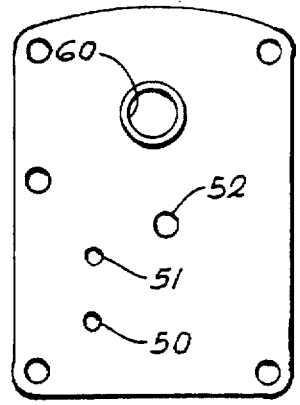
FIG. 21 is a front elevational view of the gear case shown in FIGS. 19 and 20.

Assembly 70 as illustrated in FIG. 7A comprises a substantially rectangular, planar, dielectric substrate PC board 71 having an electrically conductive circuit, designated 72, printed over the rear face thereof (see FIG. 18). Appropriate circuit components are mounted on the opposite or front face of board 71 comprising the two power terminals 32, 32, capacitor 73 and a pair of diodes 74, 74 and a normally open micro-switch 75 all suitably soldered to the printed circuit 72 in a known manner, whereby to form the control assembly 70.

Once the control assembly is completed, pinion 40 is pressed onto the outer end of the motor shaft 76 and the motor is then mounted to the PC board 71 by inserting the motor shaft and its driving pinion through the large opening 77 in board 71 and passing the ends of the positive and negative motor terminals 78, 78 through slotted openings 79, 79 in the PC board. Once the terminals 78 are through the openings 79 and the motor 30 pressed tightly against the PC board 71, the outer ends of the motor terminals are folded over against the rear face of board 71 and soldered to the respective positive and minus circuit junctions thereof, as indicated in FIG. 18. This sub-assembly is then tested by energizing the terminals 78 using the proper polarity. When the motor and control board assembly are found workably acceptable, such is ready for assembly with the molded gear case cover 28.

Figure 17:
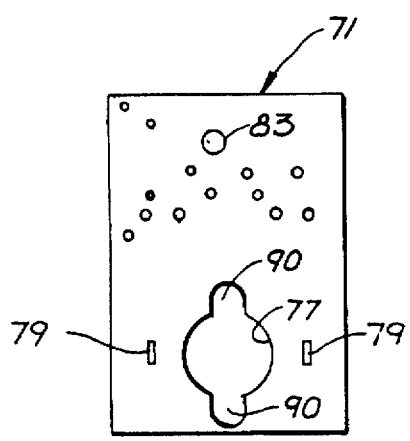
FIG. 17 is front elevational view of the control circuit board shown in FIG. 7A.

Cover 28 is distinguished by a cylindrical guide post 80 having a larger diameter cylindrical base shoulder portion 81 projecting outwardly at right angles from the front face of the planar platform wall 59. Pin 80 is designed to enter an opening 82 extending through the body of the micro-switch 75 which opening 82 is aligned with openings 83 formed through the PC board 71 (see FIGS. 17 and 18). In assembly the rear or back side of the PC board engages the outer end of shoulder 81 at the base of pin 80 to accordingly space the upper end of the board 71 from wall 59 while the pin 80 serves to locate and support the upper end of the PC board on the gear case cover and align the micro switch 75 with the cam portion 47 of the output gear 44.

In similar fashion, it will be noted that the driving pinion 40 is aligned to pass through opening 85, distinguished by an annular collar 86 formed about its periphery, in the gear case cover wall 59. Four like cylindrical stop pads 87 also project outwardly from wall 59 closely adjacent collar 86 along with two diametrically opposite pads 88 having openings receptive of threaded machine screw fasteners 89, 89 (see FIG. 7 and 11–15). The screw fasteners 89 pass freely through the pads 88 and two open lobes 90, 90 on opposite sides of the motor shaft received in opening 77 of the PC board as shown best in FIGS. 17 and 18.

The several pads 87 and 88, as well as shoulder 81, extend axially outwardly from wall 59 of cover 28 equal distances whereby to engage the back side of the PC board in assembly and uniformly space it from wall 59. Once the PC board is placed over the front side of wall 59, positive connection between the cover 28 and the sub-assembled PC board and motor 30 is effected by the two machine screws 89, 89 that pass freely through openings in the two pads 88, and the lobes 90 in the PC board which registeringly receive pads 88, to engage holes (not shown) in the end bell of the motor 30. Tightening of the screws serves to secure the PC board and motor assembly with and to the gear case cover as desired.

At this stage of assembly, the above described sub-assembled gear case cover, PC board and motor are ready to be united with the molded PC board cover 29 which is distinguished by large cylindrical opening 95 near one end of front wall 96 thereof. A cylindrical collar 97 extends outwardly of front wall 96 and has a diameter substantially equal to the exterior diameter of the motor 30. A side wall 98 borders the front wall 96 of the PC board cover and extends rearwardly therefrom. An inside shoulder 99 is formed at the outer edge of wall 98 to tightly fit over external shoulder 100 formed about the periphery of wall 59 of the gear case cover (see FIGS. 8–15).

Importantly front wall 96 of cover 29 is also distinguished by a pair of laterally spaced, slotted openings 101 aligned to receive the power connector terminals 32 therethrough.

As best indicated in FIGS. 4–6, cover 29 is placed carefully over the cylindrical outside casing of motor 30 which is closely received in the collared opening 95 and frictionally embraced by the collar wall 97. Generally the PC board terminals 32 are carefully aligned with the slotted openings 101 in cover 29 and inserted therethrough permitting the internal shoulder 99 on wall 98 to fit over and engage the external shoulder 100 of the gear case cover 28. When the two shoulders are so aligned and interfitted they are chemically or ultrasonically welded together along the engaged shoulders. This forms a unified sub-assembly of the gear case cover, PC board, motor and PC board cover.

Figure 22:
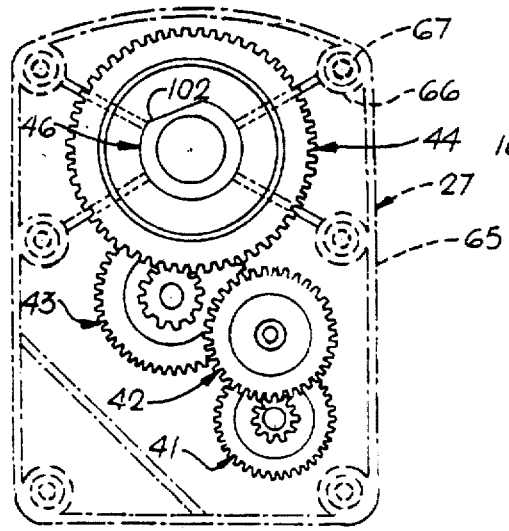
FIG. 22 is an enlarged rear elevational view of the gear case shown in FIGS. 19–21 and illustrating the assembly of the gear train therein.
Figure 23:
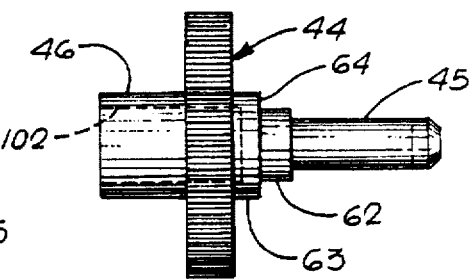
FIG. 23 is an enlarged side elevational view of the main drive gear cam and output shaft subassembly shown in FIG. 7.

It will be recalled that the gear case 27 is designed to hold a gear train made up of the several gears 41–44 as previously related (see FIGS. 7, 22 and 23). It further will be recalled that the compound large drive gear 44 has coaxially related output shaft portion 45 and cam portion 46 extending from its opposite axial ends. Cam portion 46 is formed with a generally cylindrical body having a circumferential flat 102, which may vary in extent and location depending on the end use requirements of the installation.

In operation flat 102 serves to actuate the micro-switch 75 according to rotation of the output gear 44. In the herein illustrated case when flat 102 is opposite the micro-switch actuator the switch opens to deenergize motor 30 and thereby limit rotation of output shaft 45 to a single rotation. Reenergization of the motor to move the flat 102 past the micro-switch is effected by the vending machine control circuit.

When the various gears are assembled and lubricated within the gear case 27, the pre-assembled gear case cover, PC board, motor and cover 29 are then mounted as a unit over the open side of the gear case so that the driving pinion 40 engages the teeth of the initial spur gear 41 of the gear train and the openings 68 in the gear case cover receive the collars 67 of the several gear case bosses 66. When properly aligned and oriented collars 67 are spun radially outwardly to positively join the gear case to its cover 28, thereby bringing about the overall unitary gear motor assembly 25 of this invention.

It is believed that those familiar with the art will readily recognize and appreciate the marked advancement of the present invention over the prior art and will understand that although the invention hereof as been described in association with a preferred embodiment thereof illustrated in the accompanying drawings, such embodiment is susceptible to variation, modification and substitution of equivalents without departing from the spirit and scope of this invention which is intended to be unlimited by the foregoing except as appears in the following appended claims.

The embodiments of the invention in which an exclusive property or privilege is claimed are defined as follows:

1. A gear motor assembly, comprising:

a uni-directional DC electric motor having an exterior housing, a reduction gear train driven by said motor, an output shaft rotatably driven by said gear train, a circuit board having motor control circuitry powered by a DC power source; and a three part housing consisting of a gear case, a gear case cover and a circuit board cover, said gear case housing the gear train and output shaft and having a generally planar rear wall bordered by a right angularly related side wall along its periphery, said gear case cover being a substantially planar member adapted for sealed connection with said side wall of said gear case in opposed relation with said rear wall whereby to enclose said gear train, said gear train being supported for rotation by and between one side of said gear case cover and the generally planar rear wall of said gear case;

said gear case cover supporting said circuit board and motor on a second side thereof, said circuit board cover having a substantially planar front wall integral with an uninterrupted side wall extending outwardly from the periphery of said front wall whereby to provide an enclosure having one open side for encasing said circuit board and motor;

said motor extending outwardly from said circuit board toward said front wall of said circuit board cover.

2. The assembly of claim 1, and cam means within said circuit board cover rotatably driven with said output shaft.

3. The assembly of claim 2, wherein said circuitry comprises a switch actuated by said cam means to deenergize said motor, and guide means extending from said gear case cover for locating said switch in cooperative relation with the periphery of said cam.

4. The assembly of claim 1, wherein said gear case cover and the side wall of said circuit board cover have interfitting peripheral shoulder portions which are welded together to provide a sealed enclosure about said circuit board.

5. The assembly of claim 1, wherein said circuit board cover has a cylindrical opening through one wall thereof distinguished by an axially extending annular collar for the partial passage and guidance of a cylindrical exterior housing of said motor; said collar effecting sealed engagement with said cylindrical exterior housing.

6. The assembly of claim 1 wherein said gear train and output shaft are supported by and between one side of said gear case cover and an opposing side of said gear case; said output shaft extending exteriorally through said opposing side and said gear case cover.

7. The assembly of claim 6, wherein said gear case cover supports said motor and said circuit board cover on a second side thereof; said motor rotatably driving a pinion gear for actuating said gear train; said motor being located on the opposite side of said gear case cover from said gear train.

8. The assembly of claim 1 wherein said output shaft is integral with a coaxially extending cam portion located within the interior of said circuit board cover.

9. The assembly of claim 8, and a switch mounted on said circuit board and engaged with a locating pin extending from said circuit board such that said switch is aligned for cooperative engagement with said cam portion.

10. The assembly of claim 1, characterized by said gear case and said circuit board cover each having a sealed connection with said gear case cover whereby to protectively isolate the interior of said circuit board cover and gear case from environmental contamination.

11. The method of protectively encasing the components of a gear motor assembly within a three-part sealed housing consisting of a gear case carrying a gear train and an output shaft, a gear case cover for enclosing an open side of said gear case, and a circuit board cover housing an electric motor for rotating a gear engaging drive pinion, a circuit board and motor controls for controlling operation of the motor, comprising the steps of:

assembling the motor, circuit board and motor controls on one side of the gear case cover and mounting said circuit board cover over said one side of said gear case cover, effecting sealed interconnection between said circuit board cover and said gear case cover, assembling the gear train and drive shaft in the gear case, mounting the gear case cover over the open side of the gear case to enclose the interior thereof; and effecting sealed interconnection between said gear case cover and gear case.

* * * * *